(12) United States Patent
Shi

(10) Patent No.: US 10,558,040 B2
(45) Date of Patent: Feb. 11, 2020

(54) VEHICLE-MOUNTED HEAD-UP DISPLAY SYSTEM

(71) Applicant: BOE Technology Group Co., Ltd., Beijing (CN)

(72) Inventor: Bingchuan Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 36 days.

(21) Appl. No.: 16/022,872

(22) Filed: Jun. 29, 2018

(65) Prior Publication Data

US 2019/0204596 A1    Jul. 4, 2019

(30) Foreign Application Priority Data

Jan. 2, 2018 (CN) .......................... 2018 1 0002627

(51) Int. Cl.
| | | |
|---|---|---|
| *G02B 27/01* | (2006.01) | |
| *G02B 5/02* | (2006.01) | |
| *G09G 3/00* | (2006.01) | |
| *G02B 5/30* | (2006.01) | |

(52) U.S. Cl.
CPC ....... *G02B 27/0101* (2013.01); *G02B 5/0231* (2013.01); *G02B 5/0278* (2013.01); *B60Y 2400/92* (2013.01); *G02B 5/3025* (2013.01); *G09G 3/001* (2013.01); *G09G 2380/10* (2013.01)

(58) Field of Classification Search
CPC ............ B60Y 2400/92; G02B 27/0101; G02B 3/0006; G02B 5/0231; G02B 5/0278; G02B 5/3025; G09G 2380/10; G09G 3/001
See application file for complete search history.

(56) References Cited

U.S. PATENT DOCUMENTS

| | | | |
|---|---|---|---|
| 9,081,179 B2 * | 7/2015 | Matsuura | ........... G02B 27/0101 |
| 2008/0088527 A1 | 4/2008 | Fujimori et al. | |
| 2019/0004314 A1 * | 1/2019 | Hayashi | ................. B60K 35/00 |
| 2019/0025580 A1 * | 1/2019 | Nagano | ................. B60K 35/00 |

FOREIGN PATENT DOCUMENTS

CN             101166289 B        6/2010

* cited by examiner

*Primary Examiner* — Dmitriy Bolotin
(74) *Attorney, Agent, or Firm* — Westman, Champlin & Koehler, P.A.

(57) ABSTRACT

The present disclosure provides in some embodiments a vehicle-mounted head-up display system, including a projector, a diffuser, and an imaging plate. The projector is configured to generate projection light beams in accordance with a to-be-projected image, so as to form a real image of the to-be-projected image at a light-entering surface of the diffuser. The diffuser is configured to expand the light beams and transmit the expanded light beams to the imaging plate. The imaging plate is configured to converge the expanded light beams into an imaging light beam, and transmit the imaging light beam to an interior of a vehicle through a front windshield of the vehicle, so as to form a virtual image of the to-be-projected image on a reverse extension line of the imaging light beam outside the vehicle.

20 Claims, 5 Drawing Sheets

VEHICLE-MOUNTED HEAD-UP DISPLAY SYSTEM

CROSS-REFERENCE TO RELATED APPLICATION

The present application claims a priority of the Chinese patent application No. 201810002627.9 filed on Jan. 2, 2018, which is incorporated herein by reference in its entirety.

TECHNICAL FIELD

The present disclosure relates to the field of projection display technology, in particular to a vehicle-mounted head-up display system.

BACKGROUND

Through a vehicle-mounted head-up display system, a to-be-projected image may be projected onto a front windshield of a vehicle. In the case of observing a road condition, a driver may rapidly read relevant data on a dashboard without changing a focal length of the driver's eyes, so as to improve the driving security. In the related art, the vehicle-mounted head-up display system is installed inside the vehicle, and reflects light beams from a projection device into the vehicle through a conventional catadioptric structure, so as to form a real image of the to-be-projected image.

SUMMARY

In one aspect, the present disclosure provides in some embodiments a vehicle-mounted head-up display system, including a projector, a diffuser, and an imaging plate. The projector is configured to generate projection light beams in accordance with a to-be-projected image, so as to form a real image of the to-be-projected image at a light-entering surface of the diffuser. The diffuser is configured to expand the light beams and transmit the expanded light beams to the imaging plate. The imaging plate is configured to converge the expanded light beams into an imaging light beam, and transmit the imaging light beam to an interior of a vehicle through a front windshield of the vehicle, so as to form a virtual image of the to-be-projected image on a reverse extension line of the imaging light beam outside the vehicle.

In a possible embodiment of the present disclosure, a plurality of first micro lenses is arranged at the light-entering surface of the diffuser, and each first micro lens is configured to expand a projection light beam at a first divergence angle into an expanded light beam at a second divergence angle greater than the first divergence angle.

In a possible embodiment of the present disclosure, a field lens is arranged at a light-exiting surface of the diffuser and configured to adjust an emergent direction of the expanded light beam in such a manner as to transmit the expanded light beam onto the imaging plate.

In a possible embodiment of the present disclosure, each first micro lens is of a pyramidal shape.

In a possible embodiment of the present disclosure, each first micro lens is of a rectangular pyramidal shape, and a length of a base line matches a diameter of a pixel of the to-be-projected image.

In a possible embodiment of the present disclosure, the field lens is a convex lens or a Fresnel lens.

In a possible embodiment of the present disclosure, the plurality of first micro lenses is arranged at the light-entering surface of the diffuser in an array form.

In a possible embodiment of the present disclosure, a converging lens is arranged at a light-entering surface of the imaging plate and configured to converge the expanded light beams into the imaging light beam.

In a possible embodiment of the present disclosure, a plurality of second micro lenses is arranged a light-exiting surface imaging plate, and each second micro lens is configured to adjust an emergent direction of the imaging light beam in such a manner as to enable the imaging light beam to be transmitted through the front windshield of the vehicle to a predetermined position inside the vehicle.

In a possible embodiment of the present disclosure, the converging lens is a Fresnel lens.

In a possible embodiment of the present disclosure, each second micro lens is a prism.

In a possible embodiment of the present disclosure, each second micro lens is a triangular prism.

In a possible embodiment of the present disclosure, a plurality of lens units of the Fresnel lens is spaced apart from each other at a surface of a basal layer, and a gap is arranged between two adjacent lens units and filled with a transparent medium.

In a possible embodiment of the present disclosure, the gap between two adjacent lens units is filled with the transparent medium having a refractive index identical to the basal layer.

In a possible embodiment of the present disclosure, a plurality of triangular prisms is spaced apart from each other at the light-exiting surface of the imaging plate, and a gap between two adjacent triangular prisms is filled with a transparent medium.

In a possible embodiment of the present disclosure, the vehicle-mounted head-up display system further includes a polarizer arranged between the projector and the diffuser or between the diffuser and the imaging plate, and configured to allow a polarized light beam in a polarization direction parallel to the light-entering surface of the diffuser to pass therethrough.

In a possible embodiment of the present disclosure, the diffuser has an angle relative to the imaging plate in such a manner that an incident angle of the expanded light beam entering a surface of the transparent medium in the gap between the two adjacent lens units is greater than or equal to a Brewster angle.

In a possible embodiment of the present disclosure, the projector and the diffuser are received within a hermetically sealed container arranged under an engine hood of the vehicle. The container and the engine hood are each provided with a light-exiting port for the expanded light beam, and the light-exiting port of the engine hood is covered with a transparent cover plate.

In a possible embodiment of the present disclosure, the imaging plate is attached onto a surface of the front windshield of the vehicle.

In a possible embodiment of the present disclosure, a wind deflector is arranged on the engine hood of the vehicle.

The other aspects and advantages of the present disclosure will be given or may become apparent in the following description, or may be understood through the implementation of the present disclosure.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

Figure 1:
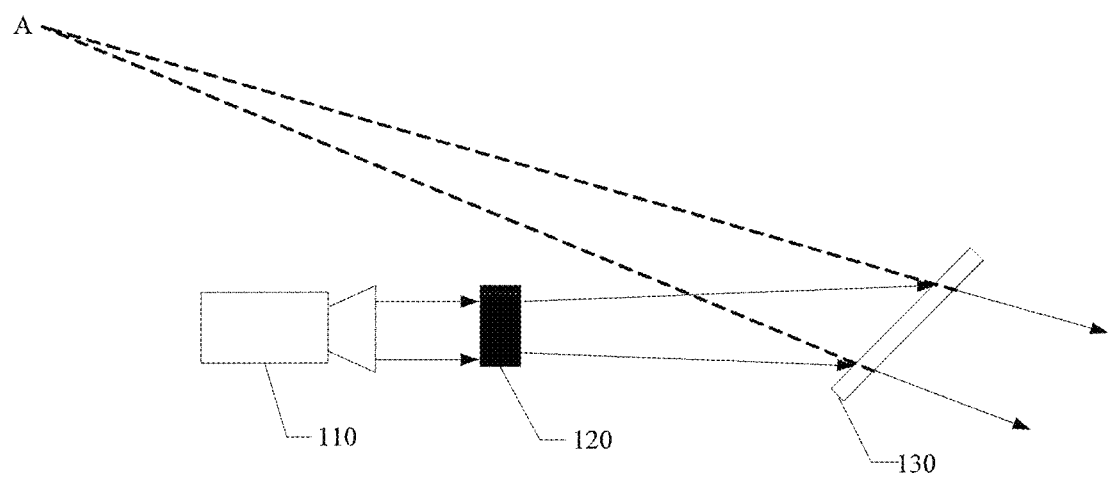
FIG. 1 is a schematic view showing a vehicle-mounted head-up display system according to one embodiment of the present disclosure.

The present disclosure will be described hereinafter in conjunction with the drawings and embodiments. The following embodiments are for illustrative purposes only, but shall not be used to limit the scope of the present disclosure. An identical or similar reference numeral in the embodiments of the present disclosure represents an identical or similar element.

In the related art, a vehicle-mounted head-up display system is installed inside a vehicle. At this time, an aperture for incident light beams capable of being received by an optical system is limited, and the amount of the light beams is relatively small, so the real image formed inside the vehicle is of insufficient quality. In addition, the vehicle-mounted head-up display system is installed inside the vehicle, so an internal passenger space of the vehicle may be reduced. The present disclosure is to provide a vehicle-mounted head-up display system installed outside the vehicle, so no internal passenger space of the vehicle is occupied by the optical system, i.e., it is able to ensure the internal passenger space of the vehicle. In addition, a projection light beam is expanded through a diffuser, so it is able to ensure a sufficient large aperture for the incident light beams for the image, thereby to ensure the quality of a virtual image of the to-be-projected image on a reverse extension line of an imaging light beam outside the vehicle.

As shown in FIG. 1, the present disclosure provides in some embodiments a vehicle-mounted head-up display system, including a projector 110, a diffuser 120, and an imaging plate 130.

The projector 110 is configured to generate projection light beams in accordance with a to-be-projected image, so as to form a real image of the to-be-projected image at a light-entering surface of the diffuser 120. In the embodiments of the present disclosure, the to-be-projected image may be data displayed on a dashboard of a vehicle.

The vehicle-mounted head-up display system needs to display the image at a relatively high brightness value, so in the embodiments of the present disclosure, the projector 110 may be, but not limited to, a high-brightness projection device, e.g., a projection device based on a liquid crystal display (LCD), liquid crystal on silicon (LCOS), a digital light processing (DLP) or a micro electromechanical system (MEMS) technique.

In a possible embodiment of the present disclosure, the projector 110 may be connected to different devices via different interfaces, so as to acquire the to-be-processed image therefrom. Then, the projection projector 110 may generate the projection light beams in accordance with the to-be-projected image, so as to form the real image of the to-be-projected image at the light-entering surface of the diffuser 120.

The diffuser 120 is configured to expand the light beams and transmit the expanded light beams to the imaging plate 130.

It should be appreciated that, depending on an image formation rule, a light-emitting angle of each pixel of the real image formed at the light-entering surface of the diffuser 120 may decrease, so that a divergence angle of the light beam for the real image may meet the requirement of an aperture for the incident light beams. In the embodiments of the present disclosure, the diffuser 120 may be arranged at a position where the real image is to be formed through the projection light beams, so as to expand the divergence angle of the projection light beam into a larger divergence angle, thereby to ensure the aperture for the incident light beams for the image and increase the number of the projection light beams.

To be specific, the projection light beams from the projector 110 may enter a light-entering surface of the diffuser 120, and then expanded by the diffuser 120, so as to increase the divergence angle of the projection light beams and meet the requirement of the aperture for the incident light beams. In addition, through expanding the projection light beams, it is able for an emergent direction of the expanded light beams to match the imaging plate 130, thereby to transmit the expanded light beams onto the imaging plate 130 efficiently.

The imaging plate 130 is configured to converge the expanded light beams into an imaging light beam, and transmit the imaging light beam to an interior of the vehicle through a front windshield of the vehicle, so as to form a virtual image of the to-be-projected image on a reverse extension line of the imaging light beam outside the vehicle.

A position of the vehicle-mounted head-up display system relative to the vehicle will be described hereinafter. In a possible embodiment of the present disclosure, the projector 110 and the diffuser 120 may be received in a hermetically sealed container arranged under an engine hood of the vehicle. The container and the engine hood are each provided with a light-exiting port for the expanded light beams, and the light-exiting port of the engine hood is covered with a transparent cover plate so as to provide a clear optical path. In addition, the projector 110 may be a high-brightness projection device and a large quantity of heat may be generated by an illuminating system. For heat dissipation of a light source of the projector 110, a wind deflector may be arranged on the engine hood.

In a possible embodiment of the present disclosure, the imaging plate 130 may be attached onto a surface of the front windshield of the vehicle. To be specific, the imaging plate 130 may be made of a rigid material, or it may also be a transparent membrane attached onto the front windshield of the vehicle.

In the embodiments of the present disclosure, the expanded light beams from the light-exiting surface of the diffuser 120 to the imaging plate 130 are diverged. In order to enable a driver to view the virtual image of the to-be-projected image formed outside the vehicle, the expanded light beams may be converged at a light-entering surface of the imaging plate 130, so as to acquire the imaging light beam. The imaging light beam may exit from a light-exiting surface of the imaging plate 130, and pass through the front windshield of the vehicle into the vehicle, so as to form the virtual image of the to-be-projected image on the reverse extension line of the imaging light beam outside the vehicle. As shown in FIG. 1, the reverse extension lines of the imaging light beams intersect at point A outside the vehicle, so the virtual image of the to-be-projected image may be formed at point A.

It should be appreciated that, the imaging light beams are acquired by converging the expanded light beams through the imaging plate 130, but the imaging light beams themselves are not converged. Illustratively but non-restrictively, the imaging light beams are also divergent like the expanded light beams, and have a divergence angle smaller than the expanded light beams.

Figure 2:
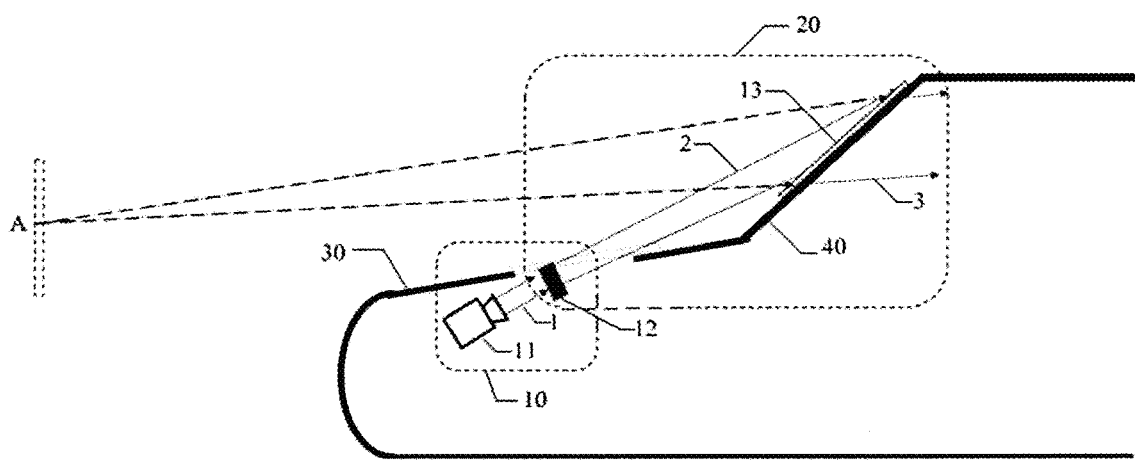
FIG. 2 is another schematic view showing the vehicle-mounted head-up display system according to one embodiment of the present disclosure.

For example, as shown in FIG. 2, the vehicle-mounted head-up display system includes a primary projection module 10 and a secondary projection module 20. To be specific, the primary projector module 10 may be mounted under the engine hood 30 of the vehicle, and it may include a projector 11 and a diffuser 12. The projector 11 and the diffuser 12 are received within a hermetically sealed container (not shown), so as to provide a clear optical path. The secondary projection module 20 includes a diffuser 12 and an imaging plate 13. The diffuser 12 serves as an image source, and the imaging plate 13 is configured to form a virtual image of the to-be-projected image capable of being viewed by the driver.

To be specific, after the projection light beams 1 have been generated by the projector 11, the projection light beams 1 may be expanded by the diffuser 12, so as to acquire the expanded light beams 2. The expanded light beams 2 may enter the light-entering surface of the imaging plate 13, and then be converged into the imaging light beam 3. Then, the imaging light beam 3 may exit from the light-exiting surface of the imaging plate 13 and pass through the front windshield 40 of the vehicle into the vehicle, so as to form the virtual image of the to-be-projected image on the reverse extension line of the imaging light beam 3 at point A outside the vehicle.

According to the vehicle-mounted head-up display system in the embodiments of the present disclosure, the projector generates the projection light beams in accordance with the to-be-projected image, so as to form the real image of the to-be-projected image at the light-entering surface of the diffuser. Next, the projection light beams are expanded by the diffuser so as to acquire the expanded light beams and transmit the expanded light beams onto the imaging plate. Next, the expanded light beams are converged by the imaging plate so as to obtain the imaging light beam, and transmit the imaging light beam through the front windshield of the vehicle into an interior of the vehicle, thereby to form the virtual image of the to-be-projected image on the reverse extension line of the imaging light beam outside the vehicle. As compared with the related art (where the vehicle-mounted head-up display system is mounted inside the vehicle, the aperture for the incident light beams capable of being received by the optical system is limited and the amount of the light beams is relatively small, so the real image formed inside the vehicle is of insufficient quality and the internal passenger space in the vehicle is reduced), through expanding the projection light beams using the diffuser, it is able to provide a sufficient large aperture for the incident light beams for the image, thereby to ensure the quality of the virtual image of the to-be-processed image formed on the reverse extension line of the imaging light beam outside the vehicle. In addition, the vehicle-mounted head-up display system is mounted outside the vehicle, so it is able to prevent the optical system from occupying an internal space of the vehicle, thereby to effectively ensure the internal passenger space in the vehicle.

Figure 3:
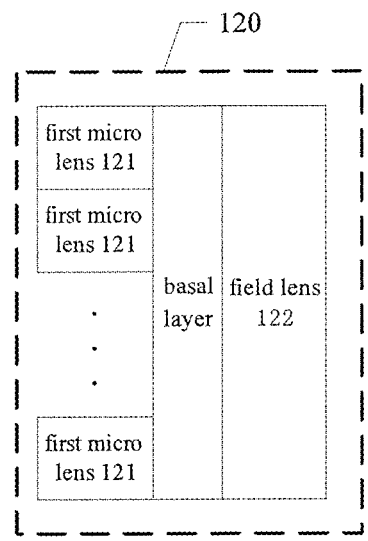
FIG. 3 is a schematic view showing a diffuser according to one embodiment of the present disclosure.

In a possible embodiment of the present disclosure, as shown in FIG. 3, a plurality of first micro lenses 121 is arranged at the light-entering surface of the diffuser 120, and a field lens 122 is arranged at a light-exiting surface of the diffuser 120.

In the embodiments of the present disclosure, through die pressing, it is able to form the first micro lenses 121 at a front surface of a basal layer and form the field lens 122 at a rear surface of the basal layer, thereby to achieve the batch production and reduce the manufacture cost.

In a possible embodiment of the present disclosure, each first micro lens 121 is configured to expand a projection light beam at a first divergence angle into an expanded light beam at a second divergence angle greater than the first divergence angle.

In a possible embodiment of the present disclosure, each first micro lens 121 may be a micro prism, e.g., it may be of a rectangular pyramidal shape. In order to enable the divergence angle of the expanded light beams to meet the requirement of the aperture for the incident light beams, a length of a base line may match a diameter of a pixel of the to-be-projected image. Through carefully arranging an angle between two adjacent base lines of a rectangular prism, it is able to adjust the divergence angles of the projection light beams in a horizontal direction and a longitudinal direction respectively.

Figure 4:
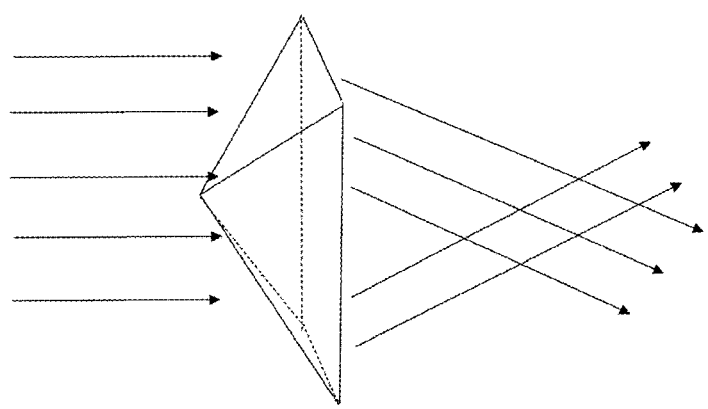
FIG. 4 is a schematic view showing a light beam diffusion principle of a rectangular prism according to one embodiment of the present disclosure.

For example, as shown in FIG. 4 which shows a light beam diffusion principle of the rectangular prism, after the light beam has passed through the rectangular prism, the divergence angle of the light beam increases obviously.

Hence, the plurality of first micro lenses 121 is arranged in an array form at the light-entering surface of the diffuser 120, so as to expand the projection light beam at the first divergence angle into the expanded light beam at the second divergence angle, thereby to enable the divergence angle of the expanded light beam to meet the requirement of the aperture for the incident light beams, and increase the amount of the projection light beams.

In a possible embodiment of the present disclosure, the field lens 122 is configured to adjust an emergent direction of the expanded light beam in such a manner as to transmit the expanded light beam onto the imaging plate 130. The field lens 122 may be a convex lens or a Fresnel lens.

Through the field lens 122, it is able to change energy distribution of the expanded light beams, and concentrate energy of the expanded light beams at a position adjacent to an optical axis, thereby to provide a maximum light intensity at the position adjacent to the optical axis. In addition, in order to enable the expanded light beams to reach the imaging plate 130 efficiently, it is necessary to adjust an emergent angle of the expanded light beams. Through the field lens 122 at the light-exiting surface of the diffuser 120, it is able to adjust the emergent direction of the expanded light beams in such a manner as to match the imaging plate 130, thereby to transmit the expanded light beams to the imaging plate 130 efficiently. In addition, through the field lens 122, it is able to increase the divergence angle of the expanded light beams to some extent.

Figure 5:
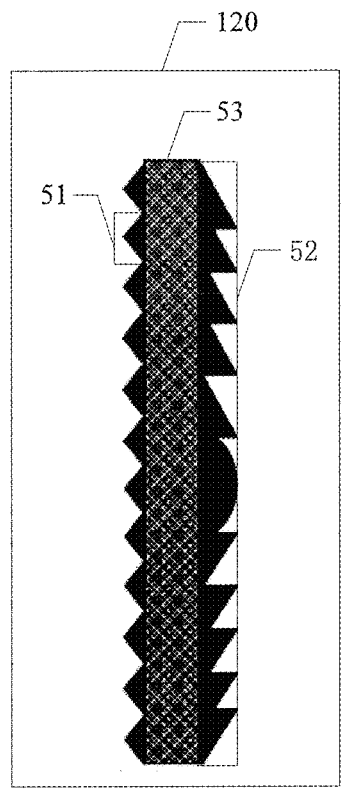
FIG. 5 is another schematic view showing the diffuser according to one embodiment of the present disclosure.

As shown in FIG. 5, each first micro lens is of a rectangular pyramidal shape, and the field lens is a Fresnel lens. A plurality of rectangular prisms 51 is arranged in an array form at the light-entering surface of the diffuser 120, a Fresnel lens 52 is arranged at the light-exiting surface of the diffuser 120, and a basal layer 53 is arranged between the Fresnel lens 52 and the rectangular prisms 51.

Figure 6:
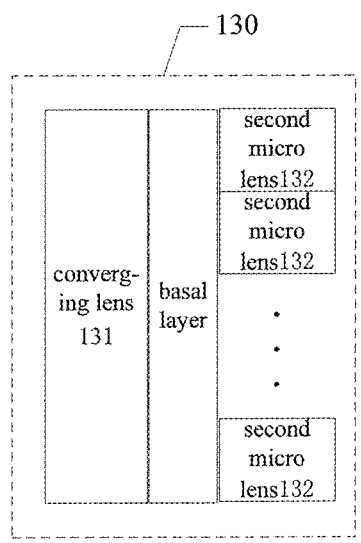
FIG. 6 is a schematic view showing an imaging plate according to one embodiment of the present disclosure.

In a possible embodiment of the present disclosure, as shown in FIG. 6, a converging lens 131 is arranged at the light-entering surface of the imaging plate 130, and a plurality of second micro lenses 132 is arranged at the light-exiting surface of the imaging plate 130.

In the embodiments of the present disclosure, the imaging plate 130 may be attached onto the surface of the front windshield of the vehicle. Through die pressing, the converging lens 131 is formed at a front surface of a basal layer, and the second micro lenses 132 are formed at a rear surface of the basal layer. In this way, it is able to achieve the batch production and reduce the manufacture cost.

In a possible embodiment of the present disclosure, the converging lens 131 may be a Fresnel lens and configured to converge the expanded light beams into the imaging light beam. Each second micro lens 132 may be a triangular prism and configured to adjust the emergent direction of the imaging light beam so as to transmit the imaging light beam through the front windshield of the vehicle to a predetermined position inside the vehicle. The predetermined position may be a position where a driving seat is located.

To be specific, in order to enable the driver to view the virtual image of the to-be-projected image formed outside the vehicle, the converging lens 131 is arranged at the light-entering surface of the imaging plate 130. In this way, it is able to converge the expanded light beams, and form the virtual image outside the vehicle at an appropriate distance. In addition, in the case that the imaging light beam passes through the front windshield of the vehicle into the interior of the vehicle, it may not necessarily reach the predetermined position, e.g., the driving seat, and at this time, it is impossible for the driver to view the virtual image on the reverse extension line of the imaging light beam outside the vehicle. Through the plurality of second micro lenses 132 arranged at the light-exiting surface of the imaging plate 130, it is able to adjust the emergent direction of the imaging light beam in such a manner as to pass through the front windshield of the vehicle to the predetermined position inside the vehicle, thereby to enable the driver to view the virtual image at the predetermined position.

Figure 7:
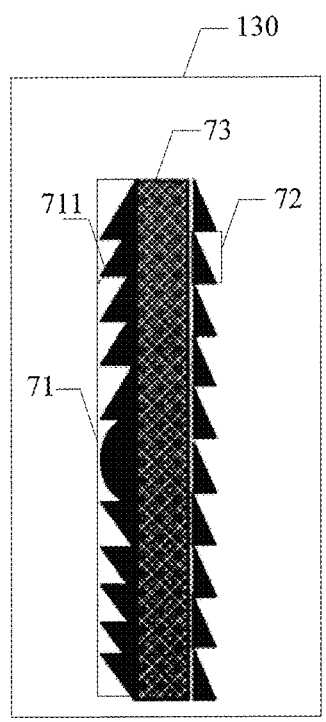
FIG. 7 is another schematic view showing the imaging plate according to one embodiment of the present disclosure.

In a possible embodiment of the present disclosure, as shown in FIG. 7, the converging lens is a Fresnel lens and each second micro lens is a triangular prism. The imaging plate 130 includes a Fresnel lens 71, triangular lenses 72 and a basal layer 73. The Fresnel lens 71 includes a plurality of lens units 711 closely spaced apart from each other, and the triangular lenses 72 are also closely spaced apart from each other. The expanded light beams from the light-exiting surface of the diffuser 120 to the imaging plate 130 are divergent, so it is impossible to display the image in a transmissive manner. In addition, the imaging plate 130 is attached onto the surface of the front windshield of the vehicle. Hence, a portion of the front windshield of the vehicle may cover the imaging plate 130, and the driver may view an object outside the vehicle through the other portion of the front windshield of the vehicle.

Figure 8:
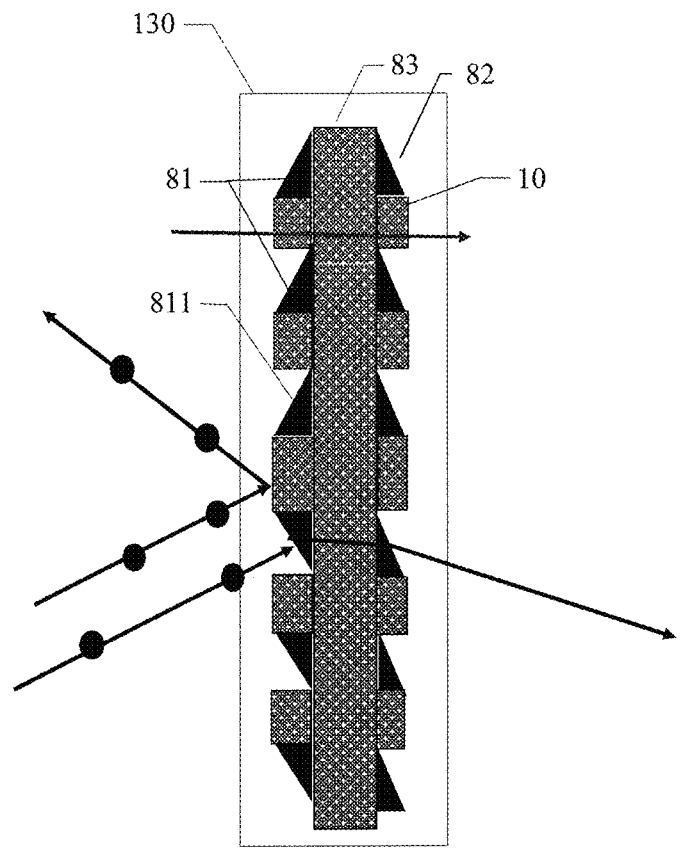
FIG. 8 is yet another schematic view showing the imaging plate according to one embodiment of the present disclosure.

In a possible embodiment of the present disclosure, the expanded light beams from the light-exiting surface of the diffuser 120 to the imaging plate 130 are divergent, so it is impossible to display the image in a transmissive manner. In order to enable the vehicle-mounted head-up display system to display the image in a transmissive manner and enable the driver to view the object outside the vehicle through the imaging plate, in a possible embodiment of the present disclosure, as shown in FIG. 8, in the case that the converging lens 131 is a Fresnel lens, the imaging plate 130 may include a Fresnel lens 81, triangular prisms 82 and a basal layer 83.

A plurality of lens units 811 of the Fresnel lens 81 are spaced apart from each other at a surface of the basal layer, and a gap is provided between two adjacent lens units 811 and filled with a transparent medium having a refractive index identical to the basal layer 83 so as to form a transparent region 10. The plurality of triangular prisms 82 are spaced apart from each other at the light-exiting surface of the imaging plate, and a gap between two adjacent triangular prisms 82 is filled with a transparent medium. Through adjusting a proportion of an area of the transparent region 10 to a total area of the imaging plate 130, it is able to control the light transmittance of the imaging plate 130, thereby to display the image in a transmissive manner. In this way, it is able for the driver to view the object outside the vehicle through the transparent region while viewing the virtual image of the to-be-projected image.

Figure 9:
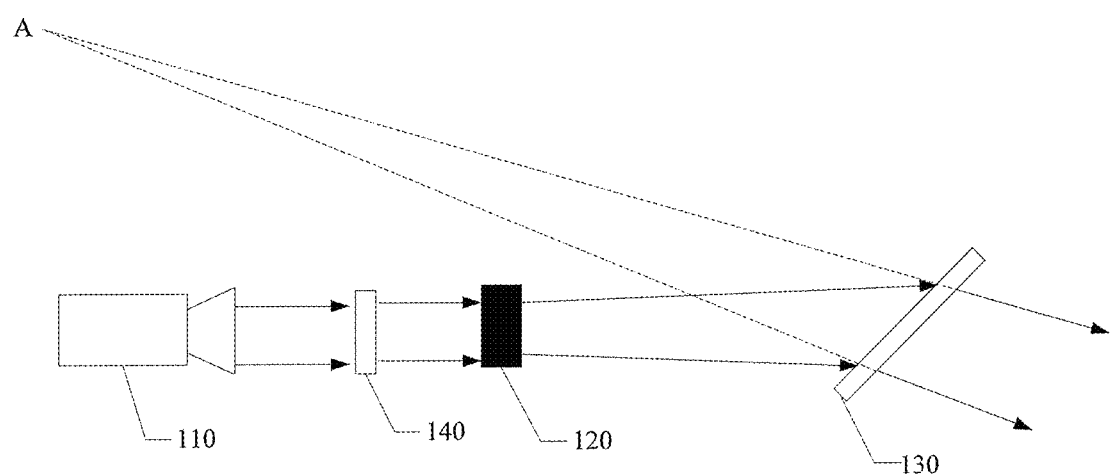
FIG. 9 is yet another schematic view showing the vehicle-mounted head-up display system according to one embodiment of the present disclosure.

It should be appreciated that, in the case that the transparent medium is filled between two adjacent lens units 811 of the Fresnel lens 81, the expanded light beams from the diffuser 120 to the imaging plate 130 may directly pass through the imaging plate 130. At this time, stray light beams may occur inside the vehicle, and thereby the driver may be interfered by the stray light beams. In the embodiments of the present disclosure, a polarizer may be provided, so as to reduce the occurrence of the stray light beams. To be specific, as shown in FIG. 9, the vehicle-mounted head-up system may further include a polarizer 140 arranged between the projector 110 and the diffuser 120 or between the diffuser 120 and the imaging plate 130, and configured to allow a polarized light beam in a polarization direction parallel to the light-entering surface of the diffuser 120 to pass therethrough.

In a possible embodiment of the present disclosure, the polarizer 140 is arranged between the projector 110 and the diffuser 120. The diffuser 120 is angle relative to the imaging plate 130 in such a manner that an incident angle of the expanded light beam entering a surface of the transparent medium in the gap between the two adjacent lens units is greater than or equal to a Brewster angle. In this way, in the case that the expanded light beams reach the surface of the transparent medium, it is able to reflect the expanded light beams to an exterior of the vehicle, thereby to prevent the driver from being adversely affected by the expanded light beams and ensure the driving security.

Such phrases as "one embodiment", "embodiments", "examples" and "for example" intend to indicate that the features, structures or materials are contained in at least one embodiment or example of the present disclosure, rather than referring to an identical embodiment or example. In addition, the features, structures or materials may be combined in any embodiment or embodiments in an appropriate manner. In the case of no conflict, the embodiments or examples or the features therein may be combined in any form.

In addition, such words as "first" and "second" are merely used to differentiate different components rather than to represent any order, number or importance, i.e., they are used to implicitly or explicitly indicate that there is at least one component. Further, such a phrase as "a plurality of" is used to indicate that there are at least two, e.g., two or three, components, unless otherwise specified.

Any process or method in the flow chart or described in any other manner may be understood as one or more modules, segments or parts containing executable instructions for performing the steps, so as to achieve customized logical functions or processes. Apart from the described or discussed order, the steps may also be performed simultaneously or in a reverse order, so as to achieve the mentioned functions.

The logic and/or steps shown in the flow charts or described in any other manner may be a sequence of executable instructions for achieving the logical functions. The instructions may be stored in any computer-readable medium, and executed by a system, unit or device (e.g., a computer-based system, a system including a processor, or any other system capable of reading the instruction from the system, unit or device), or a combination thereof. The computer-readable medium may be any unit capable of containing, storing, communicating, spreading or transferring a program which may be executed by the system, unit or device, or a combination thereof. The computer-readable medium may include, but not limited to, electrical connection member (electronic device) having one or more circuits, portable computer enclosure (magnetic unit), Random Access Memory (RAM), Read Only Memory (ROM), Electrically Programmable ROM (EPROM), optical fiber unit, and Compact Disc ROM (CDROM). In addition, the computer-readable medium may also be paper onto which the program is printed or any other appropriate medium. The paper or the other appropriate medium may be scanned, compiled, interpreted or treated in any other appropriate manner, so as to acquire the program and store it in a memory.

It should be appreciated that, the embodiments of the present disclosure may be implemented through hardware, software, firmware, or a combination thereof. The steps or method may be implemented by the software or firmware stored in the memory and executed by an appropriate system. In the case that the hardware is adopted, the steps or method may be implemented by a discrete logic circuit having a logic gate circuit capable of processing a data signal, an application-specific integrated circuit (ASIC) having an appropriate combinational logic circuit, a programmable gate array (PGA), or a field programmable gate array (FPGA), or a combination thereof.

It should be further appreciated that, all or parts of the steps in the method may be implemented by related hardware using a program stored in a computer-readable storage medium. The program is executed so as to perform one or a combination of the steps.

In addition, the functional units in the embodiments of the present disclosure may be integrated into a processing module, or the functional units may exist independently, or two or more functional units may be combined together. The functional units may be implemented in the form of hardware or software. In the case that the functional units are implemented in the form of software and sold or used as a separate product, they may also be stored in the computer-readable storage medium. The storage medium may be ROM, magnetic disc or optical disc.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A vehicle-mounted head-up display system, comprising a projector, a diffuser, and an imaging plate, wherein the projector is configured to generate projection light beams in accordance with a to-be-projected image, so as to form a real image of the to-be-projected image at a light-entering surface of the diffuser;

the diffuser is configured to expand the light beams and transmit the expanded light beams to the imaging plate; and the imaging plate is configured to converge the expanded light beams into an imaging light beam, and transmit the imaging light beam to an interior of a vehicle through a front windshield of the vehicle, so as to form a virtual image of the to-be-projected image on a reverse extension line of the imaging light beam outside the vehicle.

2. The vehicle-mounted head-up display system according to claim 1, wherein a plurality of first micro lenses is arranged at the light-entering surface of the diffuser, and each first micro lens is configured to expand a projection light beam at a first divergence angle into an expanded light beam at a second divergence angle greater than the first divergence angle.

3. The vehicle-mounted head-up display system according to claim 2, wherein each first micro lens is of a pyramidal shape.

4. The vehicle-mounted head-up display system according to claim 3, wherein each first micro lens is of a rectangular pyramidal shape, and a length of a base line matches a diameter of a pixel of the to-be-projected image.

5. The vehicle-mounted head-up display system according to claim 2, wherein the plurality of first micro lenses is arranged at the light-entering surface of the diffuser in an array form.

6. The vehicle-mounted head-up display system according to claim 1, wherein a field lens is arranged at a light-exiting surface of the diffuser and configured to adjust an emergent direction of the expanded light beam in such a manner as to transmit the expanded light beam onto the imaging plate.

7. The vehicle-mounted head-up display system according to claim 6, wherein the field lens is a convex lens or a Fresnel lens.

8. The vehicle-mounted head-up display system according to claim 1, wherein a converging lens is arranged at a light-entering surface of the imaging plate and configured to converge the expanded light beams into the imaging light beam.

9. The vehicle-mounted head-up display system according to claim 8, wherein the converging lens is a Fresnel lens.

10. The vehicle-mounted head-up display system according to claim 9, wherein a plurality of lens units of the Fresnel lens is spaced apart from each other at a surface of a basal layer, and a gap is arranged between two adjacent lens units and filled with a transparent medium.

11. The vehicle-mounted head-up display system according to claim 10, wherein the gap between two adjacent lens units is filled with the transparent medium having a refractive index identical to the basal layer.

12. The vehicle-mounted head-up display system according to claim 10, wherein the diffuser has an angle relative to the imaging plate in such a manner that an incident angle of the expanded light beam entering a surface of the transparent medium in the gap between the two adjacent lens units is greater than or equal to a Brewster angle.

13. The vehicle-mounted head-up display system according to claim 1, wherein a plurality of second micro lenses is arranged a light-exiting surface imaging plate, and each second micro lens is configured to adjust an emergent direction of the imaging light beam in such a manner as to enable the imaging light beam to be transmitted through the front windshield of the vehicle to a predetermined position inside the vehicle.

14. The vehicle-mounted head-up display system according to claim 13, wherein each second micro lens is a prism.

15. The vehicle-mounted head-up display system according to claim 14, wherein each second micro lens is a triangular prism.

16. The vehicle-mounted head-up display system according to claim 15, wherein a plurality of triangular prisms is spaced apart from each other at the light-exiting surface of the imaging plate, and a gap between two adjacent triangular prisms is filled with a transparent medium.

17. The vehicle-mounted head-up display system according to claim 1, further comprising a polarizer arranged between the projector and the diffuser or between the diffuser and the imaging plate, and configured to allow a polarized light beam in a polarization direction parallel to the light-entering surface of the diffuser to pass therethrough.

18. The vehicle-mounted head-up display system according to claim 1, wherein the projector and the diffuser are received within a hermetically sealed container arranged under an engine hood of the vehicle; and the container and the engine hood are each provided with a light-exiting port for the expanded light beam, and the light-exiting port of the engine hood is covered with a transparent cover plate.

19. The vehicle-mounted head-up display system according to claim 18, wherein a wind deflector is arranged on the engine hood of the vehicle.

20. The vehicle-mounted head-up display system according to claim 1, wherein the imaging plate is attached onto a surface of the front windshield of the vehicle.

* * * * *